United States Patent [19]

Menashi et al.

[11] Patent Number: 4,863,883
[45] Date of Patent: Sep. 5, 1989

[54] DOPED BATIO₃ BASED COMPOSITIONS

[75] Inventors: Jameel Menashi; Robert C. Reid, both of Lexington, Mass.; Laurence P. Wagner, West Chester, Pa.

[73] Assignee: Cabot Corporation, Waltham, Mass.

[21] Appl. No.: 235,356

[22] Filed: Aug. 23, 1988

Related U.S. Application Data

[63] Continuation-in-part of Ser. No. 85,043, Aug. 12, 1987, abandoned, which is a continuation-in-part of Ser. No. 859,577, May 5, 1986, abandoned.

[51] Int. Cl.⁴ ............................................. C04B 35/49
[52] U.S. Cl. .................................. 501/138; 501/134; 501/137; 501/139
[58] Field of Search ............... 501/137, 138, 139, 136, 501/134; 423/598; 252/62.9

[56] References Cited

U.S. PATENT DOCUMENTS

| | | |
|---|---|---|
| 2,758,911 | 8/1956 | Lynd et al. |
| 2,841,503 | 7/1958 | Graham et al. |
| 2,988,422 | 6/1961 | Walsh ............................. 423/598 X |
| 3,637,531 | 1/1972 | Faxon et al. ..................... 501/137 X |
| 3,647,364 | 3/1972 | Mazdiyasni et al. |
| 3,725,539 | 4/1973 | Spangenberg |
| 4,058,592 | 11/1977 | Quets ............................. 423/598 X |
| 4,061,583 | 12/1977 | Murata et al. .................. 423/598 X |
| 4,233,282 | 11/1980 | Arendt |
| 4,293,534 | 10/1981 | Arendt ............................ 501/137 X |
| 4,487,755 | 12/1984 | Arendt |
| 4,520,004 | 5/1985 | Uedaira et al. ..................... 423/598 |
| 4,534,956 | 8/1985 | Arendt et al. |
| 4,537,865 | 8/1985 | Okabe et al. ..................... 501/137 X |
| 4,543,341 | 9/1985 | Barringer et al. |
| 4,547,355 | 10/1985 | Uedaira et al. |
| 4,643,984 | 2/1987 | Abe et al. ......................... 501/136 X |
| 4,677,083 | 6/1987 | Uedaira et al. ..................... 423/598 |
| 4,696,810 | 9/1987 | Shirasaki et al. ............... 423/598 X |

FOREIGN PATENT DOCUMENTS

| | | |
|---|---|---|
| 610369 | 12/1960 | Canada . |
| 0141551 | 10/1984 | European Pat. Off. . |
| 0146284 | 11/1984 | European Pat. Off. . |
| 110107 | 6/1983 | Japan . |
| 0039723 | 3/1984 | Japan ................................. 423/598 |
| 0005006 | 1/1985 | Japan ................................. 423/598 |
| 81023 | 5/1985 | Japan . |
| 405340 | 8/1932 | United Kingdom . |
| 530584 | 6/1939 | United Kingdom . |
| 799436 | 11/1955 | United Kingdom . |
| 790093 | 3/1956 | United Kingdom . |
| 853784 | 5/1959 | United Kingdom . |

OTHER PUBLICATIONS

"Preparation of Semiconducting Titanates by Chemical Methods", Gallagher et al., *Journal of the American Ceramic Society*, vol. 46, No. 8, Aug. 21, 1963, pp. 359-365.

"Effect of pH on the Chemical Preparation of Barium-Strontium Titanate", Schrey, *Journal of the American Ceramic Society*, Aug. 1965, vol. 48, No. 8, pp. 401-405.

"Method of Wet Synthesis of Barium Titanate BaTiO₃", Kubo et al., *Kogyo Kagaku Zasshi*, 71 (1) (1968), pp. 114-118.

"Preparation of BaTiO₃ and Other Ceramic Powders by Coprecipitation of Citrates in an Alcohol", Mulder, *Ceramic Bulletin*, vol. 49, No. 11 (1970) pp. 990-993.

(List continued on next page.)

*Primary Examiner*—William R. Dixon, Jr.
*Assistant Examiner*—Karl Group
*Attorney, Agent, or Firm*—L. A. Chaletsky

[57] ABSTRACT

The present invention relates to a variety of dispersible doped multi-component BaTiO₃ based powder compositions. The primary particles of each of the products are substantially spherical, have sizes in the range of 0.05 to 0.4 microns and have narrow size distributions. Further, the compositions of the primary particles, forming each powder, are comparable. The amount of dopant oxide or oxides contained in the powder composition ranges from between greater than 1 to 10 mole percent. Regardless of the dopant or dopants utilzied, all the powder compositions of the present invention are identified by the same unique morphological characteristics.

9 Claims, 1 Drawing Sheet

OTHER PUBLICATIONS

"Alternate Matrix Material for Molten Carbonate Fuel Cell Electrolyte Structure", Arendt, *J. Electrochem. Soc.: Electrochemical Science and Technology,* vol. 129, No. 5, May 1982, pp. 979–983.

"Chemical Preparation of Doped $BaTiO_3$", Stiegelschmitt et al.; *Science of Ceramics,* vol. 12, Proceedings of the Twelfth International Conference, Jun. 1983, pp. 151–154.

"Synthesis of Fine-Grained Barium Titanate by Hydrothermal Reaction", Kaneko et al., *Nippon Kagaku Kaisha,* 1975 (6), pp. 985–990.

"Hydrothermal Synthesis of $BaTiO_3$", Matsuoka et al., Report of the Research Laboratory of Hydrothermal Chemistry, vol. 2, No. 15 (1978).

"The Molten Salt Synthesis of Large Crystal Sized $SrTiO_3$", Arendt et al., General Electric Corporate Research and Development Technical Information Series, No. 86CRD006, Feb. 1986, pp. 1–5.

"Easily Sinterable $BaTiO_3$ Powder", Abe et al., Sakai Chemical Industry Co., Ltd.

DOPED BATIO₃ BASED COMPOSITIONS

CROSS REFERENCE TO RELATED APPLICATIONS

This application is a continuation-in-part of applicants' copending application Ser. No. 085043 filed Aug. 12, 1987, abandoned which in turn is a continuation-in-part of application Ser. No. 859,577, filed May 5, 1986 and now abandoned.

BACKGROUND OF THE INVENTION

The present invention relates to barium titanate based compositions and, more particularly, relates to dispersible, submicron, doped barium titanate coforms with narrow particle size distributions.

Barium titanate based compositions are extensively used in the electronics industry for the production of capacitors, condensers and PTCR (positive temperature coefficient of resistance) devices. Barium titanate is particularly useful and versatile in electronic applications since its electrical properties can be substantially modified by the incorporation of additives and/or dopants. The additives which are frequently employed are $MAO_3$ compounds, where M is a divalent cation and A is a tetravalent cation, having the $BaTiO_3$ perovskite structure. Typical additives include the titanates, zirconates and stannates of calcium, strontium, barium and lead. Since the additive or additives have the same crystal structure as $BaTiO_3$, they readily form a solid solution during calcination or sintering. In general, additives represent more than 3 mole % of the $BaTiO_3$ based formulation. Dopants cover a wide range of metal oxides. These, in general, represent less than 5 mole % of the total $BaTiO_3$ based formulation. The dopant or dopants employed may be completely or partially miscible in the perovskite lattice or may be immiscible in the lattice. Examples of dopants employed include the oxides of La, the lanthanides, Y, Nb, Ta, Cu, Mo W, Mn, Fe, Co, Ni, Zn, Al, Si, Sb and Bi. Small amounts of some of the dopants, for example, as discussed later, Sb, exhibit a substantial effect on the electrical properties of $BaTiO_3$, based compositions.

In commercial practice, barium titanate based formulations are produced either by blending the required pure titanates, zirconates, stannates and dopants or by directly producing the desired powder by a high temperature solid state reaction of an intimate mixture of the appropriate stoichiometric amounts of the oxide or oxide precursors (e.g., carbonates, hydroxides or nitrates) of barium, calcium, titanium, etc. The pure titanates, zirconates, stannates, etc. are also, typically, produced by a high temperature solid phase reaction process.

The prior art processes for producing barium titanate and barium titanate based compositions by solid phase reactions are relatively simple; nevertheless, they do suffer from several disadvantages. Firstly, the milling steps serve as a source of contaminants which can adversely affect electrical properties. Secondly, compositional inhomogenieties, resulting from incomplete mixing on a microscale, can lead to the formation of undesirable phases such as barium orthotitanate, $Ba_2TiO_4$, which can give rise to moisture sensitive properties. Thirdly, during calcination, substantial particle growth and interparticle sintering occur. As a consequence, the milled products consist of irregularly shaped fractured aggregates which have a wide size distribution ranging from about 0.2 to about 10 microns. It has been established that green bodies formed from such aggregated powders with broad aggregate size distributions require elevated sintering temperatures and give sintered bodies with broad grain size distributions. Finally, since commercial $BaTiO_3$ based compositions can contain small but variable amounts of various impurities, each lot of $BaTiO_3$ or $BaTiO_3$ based composition produced must be qualified. The qualification procedure involves determination and, if required, modification of the electrical properties of the final sintered body by changing the levels of dopants employed.

Many approaches have been developed to try to overcome the limitations of the conventional solid state reaction processes. Precipitation of either doped barium titanyl oxalate or doped barium titanyl oxalate with partial substitution of strontium or lead for barium and zirconium for titanium is taught by Gallagher et al., "Preparation of Semiconducting Titanates by Chemical Methods," 46, *J. Amer. Chem. Soc.*, 359 (1963); Schrey, "Effect of pH on the Chemical Preparation of Barium-Strontium Titanate," 48, *J. Amer. Cer. Soc.*, 401 (1965) and Vincenzini, "Chemical Preparation of Doped $BaTiO_3$," *Proceedings of the Twelfth Intl. Conf.*, Science of Ceramics, Vol. 12, p. 151 (1983). The oxalates are decomposed at elevated temperature to form the doped barium titanate based compositions. U.S. Pat. No. 3,637,531 teaches heating a single solution of dopant, titanium compound and alkaline earth salts to form a semi-solid mass that is converted to the desired titanate based product by calcination. U.S. Pat. No. 4,537,865 discloses combining hydrous oxide precipitates of Ti, Zr, Sn, or Pb and hydrous oxides of the dopants with aqueous slurries of precipitated carbonates of Ba, Sr, Ca or Mg. The solids are calcined to give the required product. Kakegawa et al., "Synthesis of Nb-doped Barium Titanate Semiconductor by a Wet-Dry Combination Technique," 4, *J. Mat. Sci. Lets.*, 1266 (1985) describe a similar synthesis procedure.

Mulder, "Preparation of $BaTiO_3$ and Other Ceramic Powders by Coprecipitation of Citrates in an Alcohol", 49, *Ceramic Bulletin*, 990–993 (1970), prepares doped $BaTiO_3$ and $BaTiO_3$ based products by spraying an aqueous solution of citrates or formates of the constituents into an alcohol to effect dehydration and coprecipitation. The products obtained by calcination of the coprecipitated citrate or formate powders consist mostly of compact globules having sizes in the 3 to 10 micron range. U.S. Pat. No. 4,061,583 describes doped $BaTiO_3$ based compositions prepared by addition of a solution of either the nitrates or chlorides of the required constituents to an aqueous alkaline solution containing hydrogen peroxide. Decomposition of the peroxide containing precipitate at about 100° C. results in the formation of an amorphous $BaTiO_3$ based composition. Calcination of the amorphous product to about 600° C. gives crystalline powders. Unfortunately, the primary particle sizes of the products are not characterized. Replication of some of the examples given in the patent indicated that the amorphous powders had primary particle sizes which were substantially smaller than 0.05 microns. Transmission electron micrographs of the products showed that the primary particles of the 600° C. calcined products were aggregated.

In the above examples of typical prior art processes, calcination is employed to complete the synthesis of the particles of the desired compositions. For reasons already noted, this elevated temperature operation is deleterious as it produces aggregated products which after comminution give smaller aggregate fragments with wide size distributions.

U.S. Pat. Nos. 4,233,282; 4,293,534 and 4,487,755 describe synthesizing BaTiO$_3$ and BaTiO$_3$ based compositions through a molten salt reaction in which Ba is partially replaced by Sr and Ti is partially replaced by Zr. The products are characterized as being chemically homogeneous and consisting of relatively monodisperse submicron crystallites. Doped BaTiO$_3$ based products were not synthesized. Yoon et al., "Influence of the PTCR Effect in Semiconductive BaTiO$_3$," 21, *Mat. Res. Bul.*, 1429 (1986), teaches employing a molten salt process to synthesize products having the composition Ba$_{(0.900-x)}$ Sr$_{0.100}$Sb$_x$TiO$_3$ where x has the values 0.001, 0.002, 0.003 and 0.004. The bodies produced from the molten salt process exhibited greater effects on the PTCR in their resistivity-temperature characteristics and large resistivities at room temperature and larger current variations in current-time characteristics than the comparable specimens formed from powders produced by calcination of a mixture of the oxides and oxide precursors. The differences were attributed to the use of KCl in the molten salt synthesis process and to the smaller size and size distribution of the grains in the samples derived. Although the molten salt based synthesis process can be used to give submicron doped products with narrow size distribution, the powders are inevitably contaminated with alkali metals, since the molten salts consist of alkali metal salts. Of course, in most electronic applications alkali metals are deleterious contaminants.

Several aqueous based processes have been described for producing BaTiO$_3$ as well as BaTiO$_3$ based compositions where Ba is partially replaced by Sr and Ti is partially replaced by Sn or, possibly, by Zr. In the process taught in U.S. Pat. No. 3,577,487, doped multicomponent alkaline earth and/or Pb(II) titanates, stannates, zirconates and/or hafnates are prepared. In these cases either the coprecipitated hydrogels are treated with alkaline earth hydroxides and subjected to the same treatment steps as those used for producing BaTiO$_3$ or the required gels and alkaline earth hydroxides are added to a preformed BaTiO$_3$ slurry which is then subjected to fluid energy milling and calcination. Unfortunately, the products prior to fluid energy milling, were not characterized. However, experience would indicate that the doped multicomponent products, prior to milling, should have specific surface areas in excess of 20 m$^2$/g which indicates that the powder primary particle sizes are less than about 0.05 microns. Even after fluid energy milling at outlet temperatures in excess of 800° F., the multicomponent products cited in the examples had specific surface areas in excess of 18 m$^2$/g. Calcination results in a further decrease in specific surface area. This, for reasons already discussed, will lead to the formation of aggregated products.

A publication of the Sakai Chemical Industry Company entitled "Easily Sinterable BaTiO$^3$ Powder" by Abe et al. discloses a hydrothermal process for synthesizing barium titanate based coforms with the formula BaTi$_{(1-x)}$Sn$_x$O$_3$. It is expected that the morphologies of the Sn-containing coforms are comparable with those of this invention. However, Abe et al. is limited in that it teaches only the synthesis of Sn-containing BaTiO$_3$ based compositions. Perhaps, by analogy, it does suggest the use of other tetravalent cations such as Zr(IV) and, possibly, the use of Sr(II), since, like Ba(OH)$_2$, Sr(OH)$_2$ is quite soluble in aqueous media.

In our U.S. patent application Ser. No. 859,577, multicomponent powders having the general formula $$Ba_{(1-x-x'-x'')}M_xM'_{x'}M''_{x''}Ti_{(1-y-y'-y'')}A_yA'_{y'}A''_{y''}O_3$$

are disclosed where M equals Pb(II), M' equals Ca(II), M'' equals Sr(II), A equals Sn(IV), A' equals Zr(IV) and A'' equals Hf(IV), x, x', x'' and y, y', and y'' represent the atom fractions of the divalent and tetravalent cations, respectively, $x^D$ '', y, y' and y'' each having independent values ranging from 0 to 0.3 and x'' and x' each have independent values ranging from 0.01 to 0.3, so long as the sum of either (x+x'+x'') or (y+y'+y'') does not exceed 0.4. The products having the above nominal stoichiometries were produced in a general hydrothermal process and were termed coforms. Each of the coforms was characterized as being stoichiometric, dispersible, submicron and having a narrow particle size distribution.

Doping of the barium titanate coforms was not investigated either in U.S. application Ser. No. 859,577 or in Abe et al. Hence, there is absent in the prior art any doped coforms of barium titanate which include calcium and/or lead or multiple divalent and tetravalent cation substitutions which are dispersible, spherical and submicron with narrow particle size distributions except when these reagents are present at impurity levels. For example, Abe et al. found that the maximum level of any impurity in their hydrothermally derived BaTiO$_3$ product was 0.01 weight %. In practice, it may be expected that the amounts of impurities present in precipitated BaTiO$_3$ and BaTiO$_3$ based compositions will vary with the source of the reactants employed. From an examination of the purities of a number of commercially available reactants or reactant precursors, such as TiCl$_4$, ZrO(NO$_3$)$_2$, Ba(OH)$_2$, Sr(OH)$_2$ PbO, Ca(OH)$_2$, CaCO$_3$, and SnCl$_4$, it is concluded that the level of a dopant impurity to be found in prior art precipitated BaTiO$_3$ and BaTiO$_3$ based compositions, including those described in the copending 859,577 application will be much smaller than 0.1 weight %. In other words the atom fraction of an impurity such as aluminum, having an atomic weight of 27, present will be less than 0.009. Most dopants have much larger atomic weights and, even if present at the high level of 0.1 weight %, would have atom fractions which are smaller than 0.009.

As noted earlier certain dopants, even when present at impurity levels, affect the electrical properties of BaTiO$_3$. Nevertheless, the atom fractions of dopants present in practical BaTiO$_3$ based dielectric compositions, typically, have values which exceed 0.009 and, more preferably, exceed 0.01.

Accordingly, it is a primary object of the present invention to provide a dispersible, submicron doped barium titanate coform with a narrow particle size distribution.

It is another object of the present invention to provide a wide variety of doped BaTiO$_3$ based compositions having primary particle sizes in the size range between 0.05 and 0.4 microns.

It is another object of the present invention to provide a doped barium titanate based composition having exquiaxed primary particles.

It is another object of the present invention to provide doped barium titanate based compositions that are substantially free of mill media.

It is a still further object to provide doped barium titanate based compositions in which all constituents are intimately mixed on a particle size scale.

SUMMARY OF THE INVENTION

The present invention includes a wide variety of dispersible, doped coforms of barium titanate which are substantially spherical, intimately mixed on a particle size scale and submicron with narrow particle size distributions. In one important embodiment of the present invention, the doped barium titanate based coform is represented by the general formula $$XBa_{(1-x')}Ca_{x'}O \cdot YTi_{(1-y-y'-y'')}Sn_yZr_{y'}Hf_{y''}O_2 \cdot ZD,$$

wherein X, Y and Z are coefficients with X and Y having a value between 0.9 and 1.1 and Z has a value greater than 0.01 and less than 0.1, y, y', and y'' have independent values ranging from zero to 0.3, the sum of $y+y'+y''$ is less than 0.4, x' is greater than 0.01 and less then 0.4 and D represents one or more dopant oxides.

In another important embodiment of the present invention, the doped barium titanate coform is represented by the general formula $$XBa_{(1-x)}Pb_xO \cdot YTi_{(1-y-y'-y'')}Sn_yZr_{y'}Hf_{y''}O_2 \cdot ZD,$$

wherein X, Y and Z are coefficients with X and Y having a value between 0.9 and 1.1 and Z has a value greater than 0.01 and less than 0.1, y, y', and y'' have independent values ranging from zero to 0.3, the sum of $y+y'+y''$ is less than 0.4, x is greater than 0.01 and less than 0.4 and D represents one or more dopant oxides.

In a further important embodiment of the present invention, the barium titanate coform is represented by the general formula $$XBa_{(1-x-x'-x'')}Pb_xCa_{x'}Sr_{x''}O \cdot YTi_{(1-y-y'-y'')}Sn_yZr_{y'}Hf_{y''}O_2 \cdot ZD$$

wherein X, Y and Z are coefficients with X and Y having a value between 0.9 and 1.1 and Z has a value greater than 0.01 and less than 0.1, x'', y, y', and y'' each have independent values greater than zero and less than 0.3, x and x' have independent values greater than 0.01 and less than 0.3 the sum of $x+x'+x''$ is less than 0.4, the sum of $y+y'+y''$ is less than 0.4 and D represents one or more dopant oxides.

Each of the doped barium titanate based coforms of the present invention possess the same unique physical properties. The mean primary particle size of the doped barium titanate based coforms is in the range of 0.05 to 0.4 microns. Moreover, the mean particle size as determined by image analysis is comparable to the mean particle size determined by sedimentation demonstrating the the coforms are dispersible. The size distribution curve of the doped coform particles has a quartile ratio less than or equal to 2.0 which established that the doped barium titanate based coforms have a fairly narrow particle size distribution. Additionally significant is the fact that any of the dispersible, submicron doped barium titanate dielectric compositions of the present invention can be produced by a single, general hydrothermal process.

BRIEF DESCRIPTION OF THE DRAWINGS

These and other details and advantages of the invention will be described in connection with the accompanying drawings in which.

and

Figure 1:
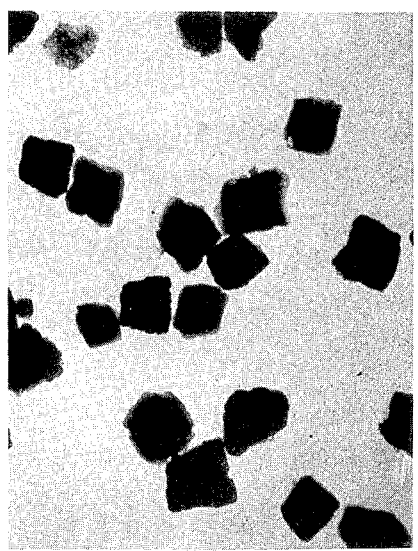
FIG. 1 is a transmission electron micrograph at 50,000× magnification of a dispersible, submicron multi-doped complex coform according to the present invention having the general formula $$1.02Ba_{0.811}Pb_{0.105}Ca_{0.081}Sr_{0.003}O \cdot$$
$$Ti_{0.832}Sn_{0.074}Zr_{0.094}$$
$$O_2 \cdot 0.012CoO \cdot 0.009MnO \cdot 0.005Nb_2O_5$$
Figure 2:
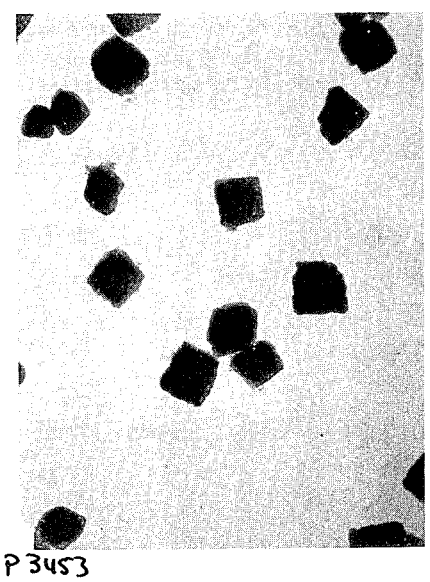

FIG. 2 is a transmission electron micrograph at 50,000× magnification of a singly doped complex barium titanate coform having the general formula $$0.99Ba_{0.792}Pb_{0.104}Ca_{0.098}Sr_{0.006}O \cdot$$
$$Ti_{0.831}Sn_{0.070}Zr_{0.099}O_2 \cdot 0.03CoO$$

which exhibits a morphology substantially similar to the morphology of the complex doped coform of FIG. 1.

DESCRIPTION OF THE PREFERRED EMBODIMENTS

The preferred embodiment of the present invention is a doped coform of the general type $$XBa_{(1-x-x'-x'')}Pb_xCa_{x'}Sr_{x''}O \cdot YTi_{(1-y-y'-y'')} \cdot$$
$$Sn_yZr_{y'}Hf_{y''}O_2 \cdot ZD$$

wherein X, Y and Z are coefficients for the divalent, tetravalent and dopant cations with X and Y having a value within the range 9 to 1.1 and, more preferably, within the range 0.95 to 1.05 and Z has a value from greater than 0.01 to 0.1 and, more preferably, from greater than 0.01 to 0.05, x'' represent the atom fraction of the divalent Sr cation and has independent values ranging from greater than zero to 0.3 and, more preferably, from greater than zero to 0.2 and x and x' represent the atom fractions of the divalent Pb and Ca cations, respectively, and have independent values ranging from greater than 0.01 to 0.3 and, more preferably, from greater than 0.01 to 0.2 and the sum $(x+x'+x'')$ has a value ranging from greater than 0.02 to 0.4 and, more preferably, from 0.02 to 0.3, y, y' and y'' represent the atom fractions of the tetravalent cations and have independent values ranging from greater than zero to 0.3 and, more preferably, from greater than zero to 0.25 and the sum of $(y+y'+y'')$ has a value ranging from greater than zero to 0.4 and, more preferably, from greater than zero to 0.3. D represents the different dopant oxides of the barium titanate coform.

Preferably, the fine, dispersible submicron powder of the present invention consists of a doped barium titanate coform having both a tetravalent and a divalent metal ion substitution of between greater than 1.0 and 30 atom percent. The divalent barium ion can be partially replaced by either lead, calcium, strontium, or mixtures thereof. Additionally, the tetravalent titanium ion can be partially replaced by tin, zirconium, hafnium or mixtures thereof.

The barium titanate based compositions are doped with small amounts of one or more of a variety of dopants including the oxides of the lanthanides, cobalt, manganese, magnesium, scandium, yttrium, antimony, bismuth, zinc, cadmium, aluminum, boron, tungsten, chromium, nickel, molybdemun, iron, niobium, vanadium, tantalum, copper silicon and mixtures thereof. The amount of dopant oxide or oxides contained in the coform ranges from between greater than one to 10 mole percent and, preferably, from greater than one to 5 mole percent. Notwithstanding which dopant or combination of dopants is employed in the barium titanate coform, the barium titanate based compositions are uniquely identified by the aforementioned morphological characteristics. Hence, both the single dopant as well as multiple dopant containing complex coforms of barium titanate consist of substantially spherical, dispersible particles having a primary particle size in the range of 0.05 and 0.4 microns with narrow size distributions.

The preferred approach for producing the doped barium titanate based coforms is to intimately mix the dopant or dopants with the tetravalent hydrous oxide or oxides. Intimate mixing can be accomplished by one of a variety of methods. Dopants may be coprecipitated with the tetravalent hydrous oxides. Alternatively, the dopants can be precipitated as high surface area hydrous oxides, washed and then combined with the tetravalent hydrous oxides. Finally, since the dopants can be precipitated in alkaline media containing Ba(II), their solutions, preferably either as salts of acetates, formates or nitrates or as ammonium salts can be added to the tetravalent hydrous oxides. The slurry of hydrous oxides and dopants is hydrothermally treated with the oxides or hydroxides of lead and/or calcium at temperatures up to 200° C. Thereafter, the slurry is cooled to a temperature between 60° and 150° C. A solution of barium hydroxide or barium hydroxide partially replaced by strontium hydroxide, heated to a temperature between 70° C. and 100° C. is added at a constant rate within a time period of 0.1 to 12 minutes to the insoluble divalent cation, tetravalent hydrous oxide and dopant slurry. The slurry is held at the addition temperature for 10 to 30 minutes and then heated to a temperature between 120° C. to 225° C. to ensure that the required degree of reaction of the hydrous oxide with the soluble divalent cation hydroxide occurs.

The primary particle size and size distribution of the coforms produced by the hydrothermal process are the same whether the doped barium titanate coforms contain simply a single dopant or, instead, contain several dopants. This becomes readily apparent from the transmission electron micrograph of the multiple dopant complex coform, $1.02Ba_{0.811}Pb_{0.105}Ca_{0.081}Sr_{0.003}O \cdot Ti_{0.832}Sn_{0.074}Zr_{0.094}O_2 \cdot 0.012CoO \cdot 0.009MnO \cdot 0.005Nb_2O_5$, in FIG. 1 which shows the presence of predominantly single, substantially spherical primary particles, having a primary particle size of 0.20 microns with a quartile ratio of 1.29 which indicates that the product has a narrow primary particle size distribution. A comparison of the multi-component doped complex barium titanate based coform of FIG. 1 with a transmission electron micrograph of a single dopant barium titanate coform, $0.998Ba_{0.792}Pb_{0.104}Ca_{0.098}Sr_{0.0060}O \cdot Ti_{0.831}Sn_{0.070}Zr_{0.099}O_2 \cdot 0.03CoO$, in FIG. 2 indicates that the morphologies of each of the barium titanate based compositions are very similar. This is further substantiated by the image analysis results which show that the product of FIG. 2 has a primary particle size of 0.18 microns and a quartile ratio of 1.26.

EXPERIMENTAL PROCEDURE

In order to evaluate the physical and chemical properties of the doped barium titanate based coforms of the present invention, a variety of laboratory tests were performed. Reagent grade chemicals or their equivalents were used throughout. The $Ba(OH)_2 \cdot 8H_2O$ products employed contained either about 1.0 mole or 0.3 mole percent Sr which tends to concentrate in the product. All solutions of $Ba(OH)_2$, maintained at 70° to 90° C., were filtered prior to use to remove any carbonate present. $CaCO_3$ was calcined at 800° C. to give CaO. The latter compound when contacted with water gives $Ca(OH)_2$. Tungsten was introduced as an ammonium tungstate solution. This was prepared by dissolving tungstic acid, $WO_3 \cdot H_2O$, in heated 2M ammonia solution with stirring; the solution formed was metastable and was used shortly after its preparation.

Hydrous oxides of $TiO_2$, $SnO_2$ and $ZrO_2$ were prepared by neutralizing aqueous solutions of their respective chlorides with aqueous ammonia at ambient temperatures. The products were filtered off and washed until chloride-free filtrates, as determined by $AgNO_3$, were obtained. A hydrous Nb(V) oxide was similarly prepared by neutralizing a solution of the fluoride of Nb(V). Mixed hydrous oxides of $TiO_2$ and $SnO_2$, and $TiO_2$ and $Sb_2O_3$ were similarly prepared by neutralizing solutions containing the chlorides of Ti(IV) and Sn(IV) and Ti(IV) and Sb(III), respectively. A coprecipitate of hydrous $TiO_2$ and $Bi_2O_3$ was prepared by neutralizing an aqueous solution containing Ti(IV) chloride and Bi(III) nitrate. The percent solids present in the washed wet cakes was determined after calcination for one hour at 900° C. Several wet cakes of each product were used during the course of the work.

All synthesis experiments were performed in a 2 liter autoclave. To prevent contamination all wetted parts of the autoclave were either made of titanium metal or were coated with Teflon ®. All synthesis experiments were performed in the absence of $CO_2$. Filtered solutions of $Ba(OH)_2$, maintained at a temperature of about 80° C., were introduced into the autoclave either by means of a high pressure pump or, for rapid addition, by discharging a solution of the $Ba(OH)_2$, contained in a heated bomb, within 10 seconds into the autoclave by means of high pressure $N_2$. The contents of the autoclave were stirred by means of a one inch diameter turbine type stirrer, operated at 1000 to 1500 RPM during the synthesis process. After synthesis, the resulting slurries were transferred to a pressure filter without exposure to the atmosphere (to prevent formation of insoluble $BaCO_3$), filtered and dried in vacuum at 100° C.

Image analysis was used to determine product primary particle size and primary size distribution. These were determined by sizing 500 to 1000 particles in a plurality of TEM fields so as to obtain the equivalent spherical diameters of the primary particles. Two or more touching particles were visually disaggregated and the sizes of the individual primary particles were measured. The equivalent spherical diameters were used to compute the cumulative mass percent distribution as a function of primary particle size. The median particle size, by weight, was taken to be the primary particle size of the sample. The quartile ratio, QR, defined as the upper quartile diameter (by weight) divided by the lower quartile diameter, was taken as a measure of the width of the distribution. Monodisperse products have a QR value of 1.0. Products with QR values in the range of 1.0 to 1.5 were classified as having narrow size distributions; those with QR values ranging from 1.5 to about 2.0 were classified as having moderately narrow size distributions while those with QR values greater than about 2.0 were classified as having broad size distributions.

Experience indicated that the doped coforms could be classified as having narrow, moderately narrow and broad size distributions by a visual examination of the TEM's. Based on this experience, visual examination was also used to classify particle size distribution of the products of this work. Since the vast majority of the doped coforms produced had narrow size distributions, in this work, average primary particle size was reliably determined by sizing 20 to 30 particles in the micrographs. Both the quantitative and semi-quantitative size measurement procedures indicated that the doped barium titanate based coforms have primary particle sizes in the range between 0.05 and 0.4 microns.

Particle size was also calculated from surface area, S.A., determined by nitrogen adsorption using the formula $D=6/(\rho S.A.)$ where D is the diameter and $\rho$ is density. In these calculations the densities of the products were calculated from the composition of the powders and the literature densities of the pure component perovskites. Since the amounts of dopants in the samples are small, and since the dopants, typically, have densities which are not very different from those of the perovskites of interest, the effect of dopant on product density was intentionally ignored. The error introduced by this approximation is small.

It should be mentioned that an exact correspondence between particle size determined by microscopy and by surface area can only be expected for monodisperse spherical powders. As the distribution broadens, the degree of sphericity decreases and particle surface roughness increases, the difference between particle sizes determined by the two techniques increases. Thus, in real systems particle size determined by microscopy is, typically, larger than the size calculated from surface area. In this work, agreement within a factor of two between the two size measurements was taken as evidence that the amounts of fine sized precipitates associated with the particles was small.

Product dispersibility was assessed by comparing the primary particle sizes and size distributions determined by image analyses with the comparable values determined by sedimentation procedures. The sedimentation process gives the particle Stokes diameter which, roughly, corresponds to the equivalent spherical diameter determined by image analysis. In this work, a Micromeritics Sedigraph (Norcross, Georgia) was employed to determine cumulative mass percent distributions in terms of Stokes diameters from which the median Stokes diameters and the QR values were calculated.

Prior to sedimentation, the powders were dispersed by a 15 to 30 minute sonification in isopropanol containing 0.12 weight percent Emphos PS-21A (Witco Organics Division, 520 Madison Ave., New York) as a dispersant.

Particle sizes determined by sedimentation and by image analysis depend on different principles. For this reason an exact correspondence in size by these two methods is not always obtained. Further, as already noted, in image analysis touching particles, some of which may be bonded together, are visually disaggregated. In the sedimentation process both touching and bound particles act as single entities. These entities occur both because of the existence of bonding (e.g., necking) between some of the primary particles forming cemented aggregates which cannot be readily broken down during the sonification process and because of less than optimum dispersion stability which leads to some flocculation. In this work, agreement within a factor of two between the median weight sizes, determined by image analysis and by sedimentation, was taken as one indication that the products were dispersible. Also, QR values determined by sedimentation are expected (and found) to be larger than those found by image analysis. It is reasonable to assume that under optimum dispersion conditions the QR value will lie between the values determined by image analysis and by sedimentation. In this work, the additional criterion used to determine dispersibility was that the QR values of the powders obtained by sedimentation was smaller than 2.0.

A qualitative procedure was also used to assess dispersibility. Experience in this work showed that products could be classified as being dispersible if the bulk of the primary particles in the TEM's were present as single particles. This qualitative assessment of dispersibility will satisfy the quantitative criterion described above for characterizing dispersibility.

Sample uniformity was determined by scanning transmission electron microscopy, STEM, having an energy dispersive X-ray analysis capability. The composition of several primary particles were determined. The product was judged to be uniform, on a particle size scale, if at least 80% of the particles contained all the powder constituents. In practice, where STEM analysis was performed, this criterion was always met. Moreover, the amounts of the various constituents, although not quantified, appeared from peak intensities to be reasonably comparable (within 80%) on a particle to particle basis.

Product composition was determined by elemental analysis using inductively coupled plasma spectroscopy, IPC, after sample dissolution. The precision of the analyses for the major constituents was about ±2%. The precision of the results for the minor elements was less than this figure. The Ba(II)/Ti(IV) atom ratios of samples which consisted predominantly of $BaTiO_3$ were also determined by X-ray fluorescence. These ratios are somewhat more precise than those determined by solution analysis and have been employed where applicable.

The doped barium titanate coforms according to the present invention include coforms having a partial substitution of divalent lead or calcium for the divalent barium. The doped coforms also include coforms in which the divalent barium is partially replaced by mixtures of lead and calcium or mixtures of lead, calcium and strontium. Partial replacement of the tetravalent titanium cation by tin, zirconium and hafnium is also within the scope of the invention. As shown in our U.S. patent application, Ser. No. 150,792, regardless of the particular divalent or tetravalent cation substitution, the morphological characteristics of the barium titanate coforms are the same. Consequently, the following non-limiting Examples include only the more complex coforms of barium titanate but are intended to provide equally representative teachings of the morphological characteristics of doped coforms of barium lead titanate and barium calcium titanate and tetravalent cation modifications thereof.

EXAMPLE 1

A series of coforms containing a single dopant were prepared by heating, from room temperature to 200° C. in about 70 minutes, 0.64 L of a vigorously stirred slurry containing, in moles, 0.167 $TiO_2$, 0.066 Sn, 0.02 $ZrO_2$, 0.022 PbO, 0.022 CaO and 0.006 dopant salt added as a nitrate. The slurry was cooled to 120° C. and 0.46 L of $Ba(OH)_2$ solution heated to between 70° and 90° C., containing about 0.21 moles $Ba(OH)_2$ was added to the slurry in 3.0±0.2 minutes. The resulting slurry temperature was held at 120° C. for approximately 30 minutes and then heated to 200° C. in about 30 minutes. The slurry samples were filtered and dried and then surface area, chemistry and morphological characteristics were determined.

| Dopant | Atom Ratio In Solids | | | | | | | |
|---|---|---|---|---|---|---|---|---|
| | Ba | Pb | Ca | Sr | Ti | Sn | Zr | Dopant |
| Co (II) | 0.790 | 0.104 | 0.098 | 0.006 | 0.831 | 0.070 | 0.099 | 0.030 |
| Mn (II) | 0.819 | 0.107 | 0.105 | 0.006 | 0.828 | 0.072 | 0.100 | 0.030 |
| La (III) | 0.802 | 0.100 | 0.085 | 0.006 | 0.841 | 0.080 | 0.087 | 0.027 |
| Cr (III) | 0.792 | 0.102 | 0.098 | 0.006 | 0.830 | 0.072 | 0.098 | 0.032 |

| Dopant | X/Y Ratio | Area (m 2/g) | Particle Size, μ | | Size Distribution |
|---|---|---|---|---|---|
| | | | Area | TEM | |
| Co (II) | 0.998 | 10.8 | 0.09 | 0.18 | Narrow |
| Mn (II) | 1.037 | 12.4 | 0.08 | 0.15 | Narrow |
| La (III) | 0.993 | 10.9 | 0.09 | 0.19 | Narrow |
| Cr (III) | 0.998 | 10.9 | 0.09 | 0.19 | Narrow |

The concentrations of of the dopants and the tetravalent hydrous oxides in the filtrates were all below the detection limits of the equipment (less than $1 \times 10^{-4}$ moles/L). It therefore can be assumed that these metals were almost quantitatively incorporated in the solid phase. The TEMS showed that the product particles are substantially spherical and submicron. The particle size determined from the surface area agreed within a factor of two with the particle size determined by microscopy, indicating that little fine-sized material was associated with the particles. All the doped coforms are classified as being dispersable. Image analysis of the TEMS of the cobalt doped product indicated a quartile ratio of 1.26. The TEMS of the other products were visually assessed and found to have similar size distributions. A quantitative assessment of dispersiblity, using the sedimentation procedure, was obtained for the manganese doped product. This procedure shows that the product has a particle size of 0.21 microns, a value which agrees well with the particle size obtained from TEMS, and a quartile ratio of 1.69. These quantitative data confirm that the product is dispersible.

EXAMPLE 2

Complex coforms containing three dopants were prepared by hydrothermal treatment using comparable amounts and sources of the tetravalent hydrous oxides and the alkaline earth and Pb(II) cations employed in Example 1. 0.002 moles of each dopant as nitrate salts or, in the case of niobium, as a $Nb(OH)_5$ wet cake, were added to the tetravalent hydrous oxide slurry prior to the barium hydroxide addition. After the hydrothermal treatment process it was found that the solid phase tetravalent and divalent atom ratios were comparable with those in Example 1 and are not reported here.

| Dopant | Mole Ratio Dopant Oxides To Perovskite | X/Y Ratio | Area ($m^2$/g) | Particle Size (microns) | |
|---|---|---|---|---|---|
| | | | | Area | TEM |
| Co (II) Nb (V) Mn (II) | 0.031 | 1.035 | 10.0 | 0.10 | 0.20 |
| Cr (III) Co (II) Al (III) | 0.024 | 1.034 | 12.6 | 0.08 | 0.15 |

About 50 to 60% of the Al(III) reported to the filtrate and, accordingly, the mole ratio of these dopant oxides to the perovskite, that is, the value of the coefficient Z, for the chromium-cobalt-aluminum doped coform was smaller than that for the cobalt-niobium-manganese doped coform. All the products appeared to be substantially spherical, dispersible and had narrow size distributions. Image analysis demonstrated that the cobalt-niobium-manganese doped coform had a primary particle size of 0.20 microns and a quartile ratio of 1.29. Sedimentation studies showed that the product had a particle size of 0.26 microns and a quartile ratio of 1.67. These quantitative measurements confirm the qualitative assessments that the products are dispersible and have narrow size distributions. The agreement within a factor of two between the particle size determined by microscopy and from surface area calculations indicates that the doped products are associated with little fine sized materials. The cobalt-niobium-manganese doped complex barium titanate coform was subjected to a STEM analysis. It was found that the particles all contained barium, lead, calcium, strontium, titanium, zirconium, tin, manganese, cobalt and niobium in roughly comparable amounts. The STEM results demonstrate that the multi-doped complex coforms of barium titanate are homogeneous on a particle size scale.

It is understood that the preceeding description is given merely by way of illustration and not in limitation of the invention and that various modifications may be made hereto without departing from the spirit of the invention as claimed.

We claim:

1. A substantially spherical powder composition having the formula

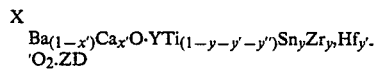

$$Ba_{(1-x')}Ca_{x'}\cdot O\cdot YTi_{(1-y-y'-y'')}Sn_yZr_{y'}Hf_{y''}\cdot O_2\cdot ZD$$

wherein X and Y have values between 0.9 and 1.1, Z has a value greater than 0.01 and less than 0.1, y, y', y'' have independent values ranging from zero to 0.3, the sum of (y+y'+y'') is less than 0.4, x' is greater than 0.01 and less than 0.4 and D is at least one dopant oxide selected from the group consisting of oxides of the lanthanides, cobalt, manganese, magnesium, yttrium, bismuth, aluminum, boron, tungsten, niobium, chromium, nickel, molybdenum, iron, antimony, vanadium, tantalum, copper, silver, zinc, cadmium, silicon and mixtures thereof and wherein, (a) the median primary particle size as determined by image analysis, is in the range of 0.05 to 0.4 microns, (b) the primary particle size distribution, as determined by image analysis, has a quartile ratio less than or equal to 1.5, (c) the median primary particle size, as determined by image analysis and by sedimentation, agree within a factor of two,
(d) the particle size distribution, as determined by sedimentation, has a quartile ratio less than or equal to 2.0, and
(e) the particle size, as determined by image analysis and by surface area, agree within a factor of two.

2. The substantially spherical powder composition of claim 1 wherein the ratio X/Y is 1.000±0.015.

3. The substantially spherical powder composition of claim 1 wherein the ratio X/Y is in the range between 0.95 and 1.1.

4. A substantially spherical powder composition having the formula $$X\ Ba_{(1-x)}Pb_xO \cdot YTi_{(1-y-y'-y'')}Sn_yZr_{y'}Hf_{y''}O_2 \cdot ZD$$

wherein X and Y have values between 0.9 and 1.1, Z has a value greater than 0.01 and less than 0.1, y, y' and y" have independent values ranging from zero to 0.3, the sum of (y+y'+y") is less than 0.4, x is greater than 0.01 and less than 0.4 and D is at least one dopant oxide selected from the group consisting of oxides of the lanthanides, cobalt, manganese, magnesium, yttrium, bismuth, aluminum, boron, tungsten, niobium, chromium, nickel, molybdenum, iron, antimony, vanadium, tantalum, copper, silver, zinc, cadmium, silicon and mixtures thereof and wherein,
(a) the median primary particle size as determined by image analysis, is in the range of 0.05 to 0.4 microns,
(b) the primary particle size distribution, as determined by image analysis, has a quartile ratio less than or equal to 1.5,
(c) the median primary particle size, as determined by image analysis and by sedimentation, agree within a factor of two,
(d) the particle size distribution, as determined by sedimentation, has a quartile ratio less than or equal to 2.0, and
(e) the particle size, as determined by image analysis and by surface area, agree within a factor of two.

5. The substantially spherical powder composition of claim 4 wherein the ratio X/Y is 1.000±0.015.

6. The substantially spherical powder composition of claim 4 wherein the ratio X/Y is in the range between 0.95 and 1.1.

7. A substantially spherical powder composition having the formula $$Sn_yZr_{y'}Hf_{y''}O_2 \cdot ZD$$

wherein X and Y have values between 0.9 and 1.1, Z has a value greater than 0.01 and less than 0.1, x", y, y', y" have independent values ranging from zero to 0.3, the sum of (y+y'+y") is less than 0.4, x and x' are each greater than 0.01 and less than 0.4 and D is at least one dopant oxide selected from the group consisting of oxides fo the lanthanides, cobalt, manganese, magnesium, yttrium, bismuth, aluminum, boron, tungsten, niobium, chromium, nickel, molybdenum, iron, antimony, vanadium, tantalum, copper, silver, zinc, cadmium, silicon and mixtures thereof and wherein,
(a) the median primary particle size as determined by image analysis, is in the range of 0.05 to 0.4 microns,
(b) the primary particle size distribution, as determined by image analysis, has a quartile ratio less than or equal to 1.5,
(c) the median primary particle size, as determined by image analysis and by sedimentation, agree within a factor of two,
(d) the particle size distribution, as determined by sedimentation, has a quartile ratio less than or equal to 2.0, and
(e) the particle size, as determined by image analysis and by surface area, agree within a factor of two.

8. The substantially spherical powder composition of claim 7 wherein the ratio X/Y is 1.000±0.015.

9. The substantially spherical powder composition of claim 7 wherein the ratio X/Y is in the range between 0.95 and 1.1.

* * * * *

UNITED STATES PATENT AND TRADEMARK OFFICE
CERTIFICATE OF CORRECTION

PATENT NO. : 4,863,883

DATED : September 5, 1989

INVENTOR(S) : Jameel Menashi; Robert C. Reid; Laurence P. Wagner

It is certified that error appears in the above-identified patent and that said Letters Patent is hereby corrected as shown below:

Col. 3, line 60, "BaTiO$^3$" should read --BaTiO$_3$--.

Col. 4, line 13, "x$^D$" should read --x"--.

Col. 6, line 20, in chemical formula, "Sr0.006O" should read --Sr$_{0.006}$O--.

Col. 6, line 36, "9" should read --0.9--.

Col. 7, line 62, in chemical formula, "CaO$_{0.098}$SrO$_{0.0060}$O" should read --Ca$_{0.098}$Sr$_{0.006}$O--.

Col. 12, lines 48-50, in chemical formula, "$XBa_{(1-x')}Ca_{x'}O \cdot YTi_{(1-y-y'-y'')}Sn_y Zr_{y'} Hf_{y''} O_2 \cdot ZD$" should read -- $X Ba_{(1-x')}Ca_{x'}O \cdot YTi_{(1-y-y'-y'')}Sn_y Zr_{y'} Hf_{y''} O_2 \cdot ZD$--.

UNITED STATES PATENT AND TRADEMARK OFFICE
CERTIFICATE OF CORRECTION

PATENT NO. : 4,863,883

DATED : September 5, 1989

INVENTOR(S) : Jameel Menashi; Robert C. Reid; Laurence P. Wagner

It is certified that error appears in the above-identified patent and that said Letters Patent is hereby corrected as shown below:

Col. 14, line 10, in chemical formula, "$Sn_y Zr_{y'} Hf_{y''} O2 \cdot ZD$" should read --$X Ba_{(1-x-x'-x'')} Pb_x Ca_{x'} Sr_{x''} O \cdot Y Ti_{(1-y-y'-y'')} Sn_y Zr_{y'} Hf_{y''} O_2 \cdot ZD$--.

Signed and Sealed this

Sixteenth Day of April, 1991

Attest:

HARRY F. MANBECK, JR.

*Attesting Officer*     Commissioner of Patents and Trademarks

UNITED STATES PATENT AND TRADEMARK OFFICE
CERTIFICATE OF CORRECTION

Page 1 of 3

PATENT NO. : 4,863,883

DATED : September 5, 1989

INVENTOR(S): Menashi et al.

It is hereby certified that error appears in the above-identified patent and that said Letters Patent is hereby corrected as shown below:

ON TITLE PAGE:
In the title "BATIO$_3$" should read --BaTiO$_3$--.

Col. 1, line 1, "BATIO$_3$" should read --BaTiO$_3$--.

Col. 2, line 55, "100°C." should read --100°C--.

Col. 2, line 58, "600°C." should read --600°C--.

Col. 2, line 65, "600°C." should read --600°C--.

Col. 3, line 16, in the chemical formula, "Sr$_{0.1}$oo" should read --Sr$_{0.100}$--.

Col. 3, lines 53-54, "800°F.," should read --800°F,--.

Col. 5, lines 17-19, the chemical formula, "XBa$_{(1-x')}$Ca$_x$O.YTi$_{(1-y-y'-y'')}$Sn$_y$Zr$_{y'}$Hf$_{y''}$O$_2$.ZD" should read --XBa$_{(1-x')}$Ca$_{x'}$O.YTi$_{(1-y-y'-y'')}$Sn$_y$Zr$_{y'}$Hf$_{y''}$O$_2$.ZD--.

UNITED STATES PATENT AND TRADEMARK OFFICE
CERTIFICATE OF CORRECTION

PATENT NO. : 4,863,883

DATED : September 5, 1989

INVENTOR(S): Menashi et al.

It is hereby certified that error appears in the above-identified patent and that said Letters Patent is hereby corrected as shown below:

Col. 7, line 37, "70°C. and 100°C." should read --70°C and 100°C--.

Col. 7, line 42, "120°C. to 225°C." should read --120°C to 225°C--.

Col. 8, lines 10-11, "90°C.," should read --90°C,

Col. 8, line 12, "800°C." should read --800°C--.

Col. 8, line 42, "80°C.," should read --80°C,--.

UNITED STATES PATENT AND TRADEMARK OFFICE
CERTIFICATE OF CORRECTION

PATENT NO. : 4,863,883

DATED : September 5, 1989

INVENTOR(S) : Menashi et al.

It is hereby certified that error appears in the above-identified patent and that said Letters Patent is hereby corrected as shown below:

Col. 11, line 4, "200°C." should read --200°C--.

Col. 11, line 8, "120°C." should read --120°C--.

Col. 11, line 9, "70° and 90°C.," should read --70° and 90°C,--.

Col. 11, line 12, "120°C." should read --120°C--.

Col. 11, line 13, "200°C." should read --200°C--.

Signed and Sealed this

Thirty-first Day of December, 1991

Attest:

HARRY F. MANBECK, JR.

Attesting Officer     Commissioner of Patents and Trademarks